US010918244B2

(12) United States Patent
De' Longhi

(10) Patent No.: US 10,918,244 B2
(45) Date of Patent: Feb. 16, 2021

(54) APPARATUS FOR COOKING FOOD PRODUCTS

(71) Applicant: DE' LONGHI APPLIANCES S.R.L. CON UNICO SOCIO, Treviso (IT)

(72) Inventor: Giuseppe De' Longhi, Treviso (IT)

(73) Assignee: De' Longhi Appliances S.R.L Con Unico Socio, Treviso (IT)

( * ) Notice: Subject to any disclaimer, the term of this patent is extended or adjusted under 35 U.S.C. 154(b) by 573 days.

(21) Appl. No.: 15/556,588

(22) PCT Filed: Mar. 9, 2016

(86) PCT No.: PCT/IB2016/051330
§ 371 (c)(1),
(2) Date: Sep. 7, 2017

(87) PCT Pub. No.: WO2016/142875
PCT Pub. Date: Sep. 15, 2016

(65) Prior Publication Data
US 2018/0055287 A1    Mar. 1, 2018

(30) Foreign Application Priority Data
Mar. 9, 2015   (IT) ............................ UD2015A000028

(51) Int. Cl.
*A47J 37/12*   (2006.01)
(52) U.S. Cl.
CPC .................................. *A47J 37/1285* (2013.01)
(58) Field of Classification Search
CPC ........ A47J 37/1285; E02F 3/307; E02F 3/438

USPC .......................................................... 99/355
See application file for complete search history.

(56) References Cited

U.S. PATENT DOCUMENTS

| 5,076,333 | A | * | 12/1991 | Law | B65D 47/283 |
| | | | | | 141/198 |
| 5,762,117 | A | * | 6/1998 | Law | B65D 25/48 |
| | | | | | 141/198 |
| 5,782,171 | A | * | 7/1998 | Crain | A47J 37/1223 |
| | | | | | 137/75 |
| 6,085,641 | A | * | 7/2000 | De'Longhi | A47J 37/1285 |
| | | | | | 99/403 |
| 6,675,842 | B1 | * | 1/2004 | Fitter | B65B 1/04 |
| | | | | | 141/114 |
| 7,383,855 | B2 | * | 6/2008 | Rogers | F16K 17/19 |
| | | | | | 137/493.8 |
| 8,800,820 | B2 | * | 8/2014 | Girard | A47J 31/402 |
| | | | | | 137/614.11 |
| 2002/0178932 | A1 | * | 12/2002 | Cai | A47J 27/04 |
| | | | | | 99/516 |
| 2011/0266273 | A1 | * | 11/2011 | Wang | A47J 27/004 |
| | | | | | 219/438 |

FOREIGN PATENT DOCUMENTS

GB       661 921 A    11/1951
WO   2004/034861 A1    4/2004

* cited by examiner

*Primary Examiner* — Dana Ross
*Assistant Examiner* — Joseph W Iskra
(74) *Attorney, Agent, or Firm* — BakerHostetler

(57) ABSTRACT

An apparatus for cooking food products, comprising a main body, a containing chamber suitable to contain a cooking liquid, an exit element of the cooking liquid from said containing chamber, and a removal device.

7 Claims, 2 Drawing Sheets

APPARATUS FOR COOKING FOOD PRODUCTS

CROSS-REFERENCE TO RELATED APPLICATIONS

This application is a National Stage of International patent application PCT/IT2016/051330, filed on Mar. 9, 2016, which claims priority to foreign Italian patent application No. UD2015A000028, filed on Mar. 9, 2015, the disclosures of which are incorporated by reference in their entirety.

FIELD OF THE INVENTION

The present invention concerns an apparatus for cooking food products, for example fryers.

In particular, the present invention is applied to fryers for use in the domestic, professional or semi-professional fields, which use a liquid to cook the food products, for example oil.

The present invention intends to allow an effective removal and discharge of the cooking liquid from the cooking apparatus, at the same time allowing easy and rapid cleaning of the devices that perform the removal and discharge functions.

BACKGROUND OF THE INVENTION

When a fryer is used, a certain amount of cooking liquid is poured inside a containing chamber. A cooking liquid can be a fat substance of vegetable origin (for example seed oil, olive oil), or a fat substance of animal origin (for example lard or butter) inside which the food product is totally or partly immersed.

It is also known that in a fryer the cooking liquid can only be used a limited number of times, which means it must be periodically replaced, totally or at least partly.

It is also known that the cooking liquid comes from animal or vegetable fat and therefore the operation to replace it is neither clean nor quick. Furthermore, this operation entails waiting, so that the cooking liquid can cool down, and more time is needed to remove it and completely discharge it from the containing chamber.

One thing to be considered in carrying out this operation is the dirt that deposits on the surfaces. This dirt is difficult to remove and entails a long time and difficulties to complete the cleaning of the parts affected.

It is also known that, during frying, particles can separate from the food products, mix with the cooking liquid and then deposit and remain on the bottom of the containing chamber.

A typical method for removing the cooking liquid from the tank provides to progressively incline the fryer to facilitate exit from an aperture on the bottom or near the bottom of the containing chamber.

This solution entails risks of scalding the user, and also difficulties in directing the liquid to a collection receptacle, with the risk of leakages and dirtying the surfaces adjacent to the discharge zone.

Specific devices are also known that facilitate the procedure to remove the cooking liquid, even when the latter is at relatively high temperatures.

U.S. Pat. No. 6,085,641 provides to use a discharge tube made of elastically deformable material, for example silicone or suchlike, directly connected to an extension of the tank.

Thanks to the material of which it is made, the discharge tube can be activated from an inactive condition to an operating condition simply by bending the tube itself. The flow of the cooking liquid into receptacles outside the fryer, or into purification filters, is facilitated by the user inclining the containing chamber.

One disadvantage is that, over time, cracks occur due to the deterioration of the material. The alteration in the physical characteristics of the tube is promoted by the high temperatures of the cooking liquid. In particular, the cracks are created in correspondence with the point where the discharge tube bends, when not in use, causing accidental dripping of the cooking liquid.

WO2004/034861 provides to remove the cooking liquid contained in a tank, equipping the fryer with two segments of discharge tube, separate and solidly attached to the fryer. One tube is directly connected to the tank of the fryer and the other, more external, constitutes the final exit segment of the cooking liquid from the containing chamber. The two parts of the tube are connected to the respective facing ends by means of a joining element with a degree of freedom around its axis of rotation. The axis of rotation is parallel to the resting plane of the fryer. In this way, the more external tube can be rotated and aligned with the segment of tube directly connected to the tank of the fryer, allowing the cooking liquid to be removed from the tank.

One disadvantage of this solution is that the discharge tube, having a limited diameter, can get obstructed due to residues of food, or agglomerations of cooking liquid, which remain suspended in the liquid when frying is concluded.

Another disadvantage is that, once the tank is emptied, it is extremely complex to clean the removal device of the cooking liquid because it remains largely attached to the containing chamber.

Another solution provides to use a tap, generally the ball valve type, to allow to empty the oil from the tank.

This solution too suffers from the disadvantage that residues of food can easily obstruct the discharge tube, given that it is generally L-shaped and therefore difficult to maintain and clean.

Another example of a cooking apparatus is described in US2011/0266273. The apparatus comprises a main body inside which a cooking chamber is disposed, with an exit to which a removable device can be selectively associated.

One purpose of the present invention is to obtain a cooking apparatus with a device to remove the cooking liquid that is largely removable, in order to allow a better, easier and quicker cleaning after the removal operation.

Another purpose of the present invention is to facilitate the exit, through the removal device, of possible particles of food products that partly obstruct the exit passage.

Another purpose of the present invention is to allow to remove the removal device even with the tank still full.

Another purpose is to retain possible residues that could escape from the bottom of the tank.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the present invention concerns an apparatus for cooking food products, comprising a containing chamber into which a cooking liquid is poured.

The cooking apparatus also comprises a removal device to allow to discharge the cooking liquid from the containing chamber.

According to the present invention, the removal device is removably connected to an exit element mounted on the containing chamber, substantially in correspondence with its bottom or near to it.

In one embodiment of the invention, the exit element comprises at least a valve retention element associated with elastic means which, in a detached condition with respect to the removal device, define a closed condition of the exit element, that is, they seal the containing chamber with respect to the outside.

The removal device is removably connected to the exit element by an attachment element configured so as to have at least one surface mating with a corresponding contact surface of the exit element.

The attachment element is preferably made, in both shape and material, so as to adhere through same-shape coupling with the corresponding contact surface of the exit element.

The removal device can be removably attached to the exit element by a rapid attachment system, for example the pressure type, bayonet, snap-in or other analogous or similar type.

In one characteristic of the present invention, the removal device can be selectively disconnected from the exit element, automatically determining the re-closing of the exit element and hence an interruption to the passage of the cooking liquid.

In another characteristic of the present invention, the cooking apparatus comprises an automatic command device associated with the valve retention element, which selectively blocks the exit of the cooking liquid from the containing chamber.

In another characteristic of the present invention, gaskets are provided, to guarantee the hydraulic seal between the removal device, that is, the removable part, and the exit element, that is, the fixed part, until the complete closure of the valve retention element is ensured.

In another characteristic of the present invention, a filtering element can be comprised inside the exit element, which functions as an obstacle to the passage of possible residues and corpuscles of food toward the removal device.

In another characteristic of the present invention, the attachment element comprises thrust elements which, when connected to the exit element, thrust the valve retention element toward the inside of the containing chamber, determining an open condition to allow the cooking liquid to pass through the exit element and exit from the containing chamber.

In another characteristic of the present invention, the removal device comprises a discharge tube which can assume a first inactive position, in which it interrupts the flow, with the longitudinal axis of the tube angled with respect to the axis of the attachment element and the exit element, and a second removal position in which the longitudinal axis of the discharge tube is substantially aligned with the longitudinal axis of the attachment element and the exit element.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We shall now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Figure 1:
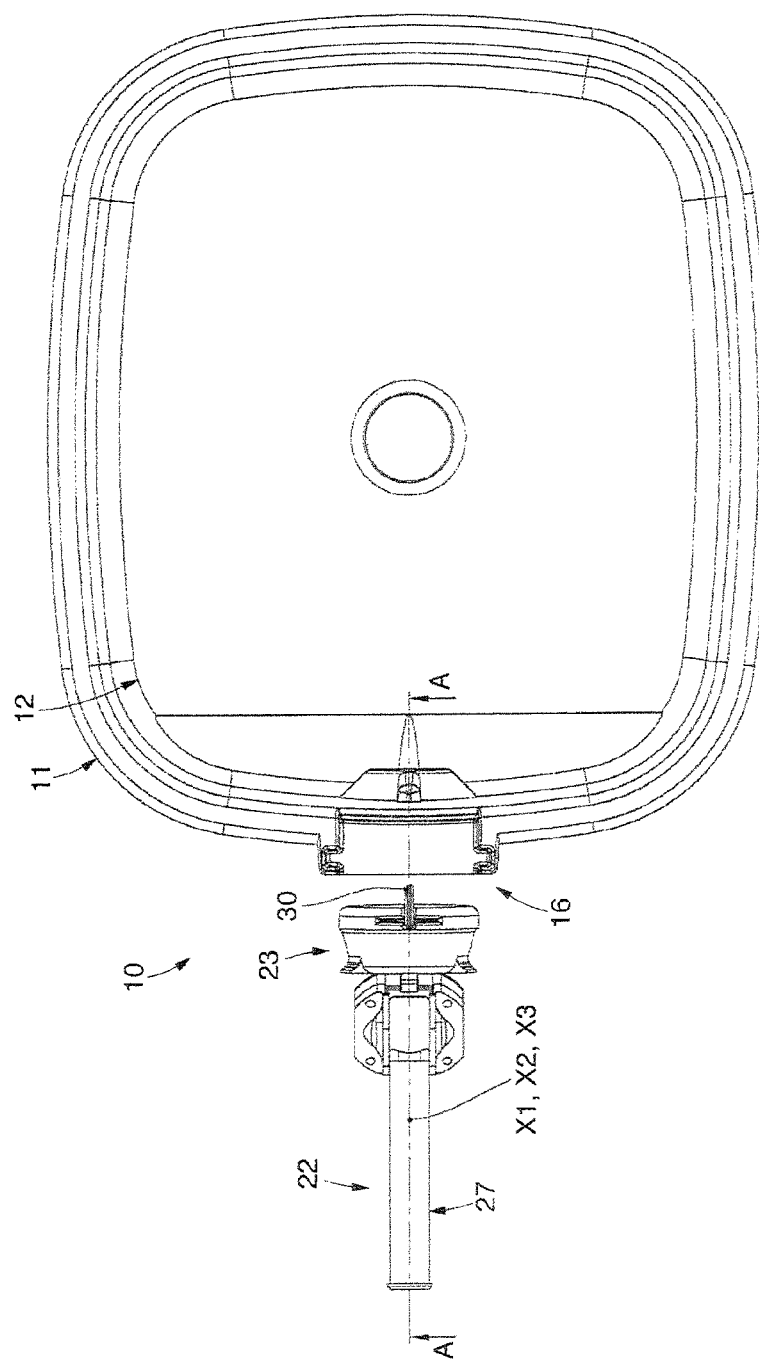
FIG. 1 is a view from above of an apparatus for cooking food.
Figure 2:
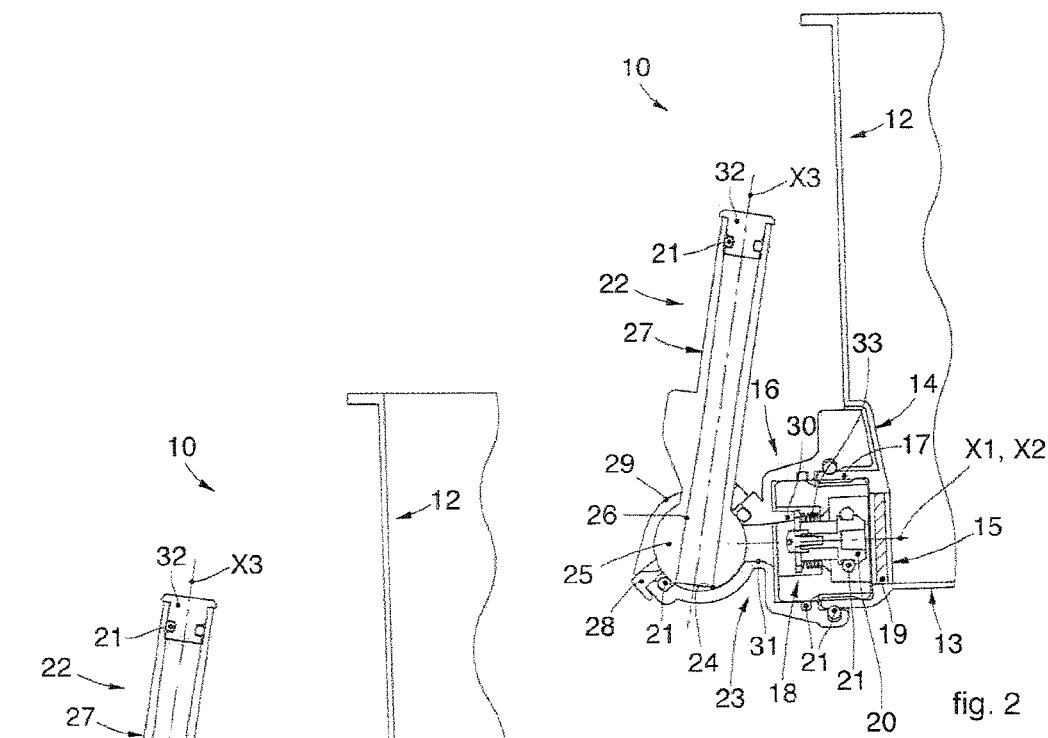
FIG. 2 is a lateral section of the removable device in a first position of use.
Figure 3:
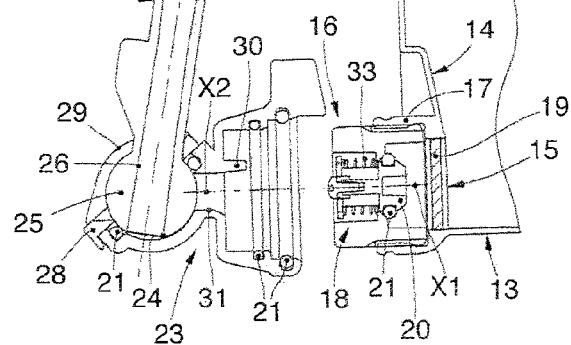
FIG. 3 is a lateral section of the removable device in another position of use.
Figure 4:
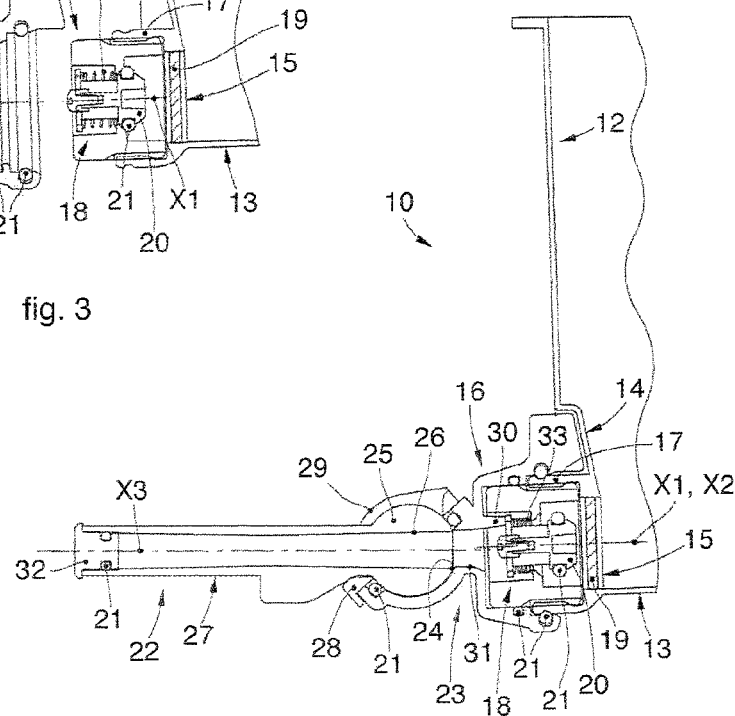
FIG. 4 is a lateral section of the removable device in another position of use.

According to the present description, shown in its entirety only in FIG. 1 and partly in FIGS. 2-4, the invention concerns a cooking apparatus 10 for food products. By cooking apparatus for food products, hereafter, we will refer particularly to a fryer for use in the domestic, professional or semi-professional fields.

It is understood that the cooking apparatus 10 can be any other type of apparatus able to cook food products by heating any type of cooking liquid and/or oil or fat contained inside it, and by means of partial or total immersion of the food product in the liquid.

The cooking apparatus 10 comprises a main body 11, visible in FIG. 1, substantially defining its bulk, made either of a plastic material resistant to high temperatures, for example polypropylene (PP), or polyethylene terephthalate (PET), or a metal alloy.

The main body 11 has a hollow configuration and is open at the top to comprise a containing chamber 12.

The containing chamber 12 can be made of an aluminum alloy, or stainless steel, and can comprise inside it a cooking liquid up to a level that is normally predetermined.

In a particular embodiment, and with reference to FIGS. 2, 3 and 4, the lateral wall of the containing chamber 12, near the bottom 13, has a lateral bevel 14 recessed toward the inside.

In substantial correspondence with the bottom 13, on the lateral wall, substantially at its lower end, there is an aperture 15, advantageously circular, able to promote the exit of the cooking liquid from the chamber 12.

The aperture 15 is defined by a longitudinal axis $X_1$ which, in the embodiment shown, is substantially parallel to the bottom 13; according to variants not shown, the bottom 13 can also be inclined so as to promote the outflow.

In a position correlated to the aperture 15, the main body 11 comprises an exit element 16 with a mouth 17, tubular in shape and with a circular cross section.

In a variant embodiment, the mouth 17 can be replaced by a simple aperture, for example with a circular shape.

The exit element 16, in this case together with the mouth 17, allows to create a selective connection between the inside of the containing chamber 12 and a suitable device for removing and discharging the cooking liquid.

The longitudinal axis of the mouth 17 is advantageously aligned with the longitudinal axis $X_1$ of the aperture 15.

The exit element 16 also comprises an automatic command device 18, to selectively close the aperture 15, which can be solid with the mouth 17 and not removable. In this case, the automatic command device 18 is housed inside the mouth 17.

In another embodiment, the automatic command device 18 can be selectively removed from the mouth 17, if this is necessary. In particular, the automatic command device 18 can be removed to possibly clean a filtering element 19 which can be disposed inside the mouth 17, between the aperture 15 of the containing chamber 12 and the automatic command device 18.

When connected to the mouth 17, the longitudinal axis of the automatic command device 18 is aligned with the longitudinal axis of the aperture 15.

The automatic command device 18 is connected to a valve retention element 20, selectively openable and closable; the valve retention element 20 comprises elastic drive means, in this case a return spring 33.

In the closed condition (FIG. 2), together with a gasket 21 which can be the O-ring type, the valve retention element 20 interrupts the passage of the cooking liquid toward the outside of the containing chamber 12, while in the open condition (FIGS. 3 and 4), it allows the cooking liquid to pass through the exit element 16 to exit from the containing chamber 12.

The automatic command device 18 can be made of plastic material, for example polyphenylene sulfide (PPS), or polyethylene terephthalate (PET), or any other material resistant to high temperatures, or a metal material.

The cooking apparatus 10 also comprises a removal device 22 which allows the flow of cooking liquid to be discharged through the exit element 16 to be conveyed to the outside.

The removal device 22 comprises an attachment element 23 and a discharge tube 27.

Both the attachment element 23 and the discharge tube 27 can be advantageously made of plastic material, for example polyphenylene sulfide (PPS), or polyethylene terephthalate (PET), or any other material resistant to high temperatures, or a metal material.

The attachment element 23 is selectively and removably connected, on one side, to the exit element 16, and has a configuration in terms of shape and sizes such that it can be coupled mechanically to the mouth 17 and to the automatic command device 18.

The attachment element 23 has a mainly circular conformation with a longitudinal axis $X_2$ which, when connected to the exit element 16 (FIGS. 3 and 4), is substantially aligned with the longitudinal axis $X_1$.

The connection of the attachment element 23 and the exit element 16 provides reciprocal clamping, or exerting a pressure until the mechanical clamping is obtained, or by screwing, with a snap-in or bayonet connection, or any other mean suitable for the purpose.

The attachment element 23, in the part opposite to the connection side to the exit element 16, is removably connected to the discharge tube 27.

The discharge tube 27 has a free external end and an internal end associated with a concave aperture 24 made in the attachment element 23, which functions as a seating for the selective rotation of a shutter element 25.

The attachment element 23 and the concave element 24 are connected by a channel 31.

The attachment element 23 also comprises at least two thrust teeth 30, the function of which will be clarified later.

The shutter element 25 comprises a recess 26 inside which the discharge tube 27 is at least partly housed, which has a circular cross section defined by a longitudinal axis $X_3$.

The discharge tube 27 can be rotated, with respect to the position defined by the exit element 16, between a first position in which the axis $X_3$ is substantially aligned with the longitudinal axis $X_2$ of the attachment element 23, and hence also with the longitudinal axis $X_1$ of the exit element 16, and a second position in which the longitudinal axis $X_3$ is angled with respect to the axes $X_1$ and $X_2$.

In the first position (FIGS. 3 and 4), the automatic command device 18 acts on the valve retention element 20 to open the passage of the exit element 16 and to allow to discharge the cooking liquid from the containing chamber 12, while in the second position the passage is interrupted, as will be seen hereafter.

The attachment element 23 also comprises, in correspondence with its concave aperture 24, a gasket 21 of the O-ring type.

The attachment element 23 also comprises another two gaskets 21 of the O-ring type, in its cylindrical coupling part to the exit element 16, which perform the function of retaining accidental leakages of cooking liquid. The gaskets 21 also guarantee the hydraulic seal between the removal device 22, which constitutes the removable element, and the exit element 16, which constitutes the fixed part, until the complete closure is ensured of the valve retention element 20.

The removal device 22 also comprises a guide portion 28, which comprises a hollow 29.

In a particular embodiment, the shutter element 25 can selectively rotate, its movement being guided by the guide portion 28. The rotation of the shutter element 25 is by an angle equal to the amplitude of the hollow 29, the walls of which thus substantially perform the guide and end-of-travel functions.

In particular, when the discharge tube 27 is in the position to remove and discharge the cooking liquid from the containing chamber 12 (FIG. 4), the shutter element 25 abuts against a lateral wall of the hollow 29, creating a substantial connection of the recess 26 with the channel 31.

In this way the flow of cooking liquid can easily by conveyed toward the discharge tube 27 and then discharged from the containing chamber 12.

The discharge tube 27 also comprises a closing stopper 32 which can be made of elastic material, for example silicone, or a plastic material, for example polypropylene (PP), or polyethylene terephthalate (PET) or polycarbonate, or similar materials resistant to high temperatures.

The closing stopper 32 can comprise another gasket 21, which can be the O-ring type, in order to guarantee the hydraulic seal with the discharge tube 27.

The closing stopper 32 can selectively close the free and open end of the discharge tube 27 to prevent accidental leakages of the cooking liquid during frying and/or operations to discharge the oil and/or during possible movements of or interventions on the cooking apparatus 10.

The closing stopper 32 can be selectively removed from the discharge tube 27 when the discharge tube 27 is in the removal position and the cooking liquid is to be made to flow from the containing chamber 12 toward the outside.

The removal device 22, as we said, is removable from the exit element 16 and can therefore be selectively connected or disconnected to/from it.

In particular, when the removal device 22 is temporarily connected to the exit element 16 (FIGS. 3 and 4), the teeth 30 keep the valve retention element 20 pressed toward the inside of the main body 11, acting against the return spring 33 and determining the momentary opening of the passage of the cooking liquid from the containing chamber 12 toward the outside. In this way, the cooking liquid can be easily removed and discharged, the discharge tube 27 having been correctly positioned (FIG. 4).

When the removal device 22 is removed from the exit element 16 (FIG. 2), for example to clean, maintain or replace it, the retention element 20 automatically moves to the closed position thanks to the action of the spring 33, thus preventing unwanted leakages of the cooking liquid.

The removal of the removal device 22 can also facilitate the transport, storage, packaging, cleaning or washing of the containing chamber 12 or other components of the cooking apparatus 10.

Furthermore, if the discharge tube 27 gets blocked due to food residues, the complete removal of the removal device 22 from the containing chamber 12 facilitates the removal of said residues.

Moreover, the discharge tube 27 too can be dis-associated from the attachment element 23 to promote its cleaning and maintenance.

The presence of the filtering element 19 associated with the exit element 16, in particular with the aperture 15, allows to filter from the cooking liquid any possible food residues contained inside it.

It is clear that modifications and/or additions of parts may be made to the apparatus 10 for cooking food products as described heretofore, without departing from the field and scope of the present invention.

It is also clear that, although the present invention has been described with reference to some specific examples, a person of skill in the art shall certainly be able to achieve many other equivalent forms of apparatuses for cooking food products, having the characteristics as set forth in the claims and hence all coming within the field of protection defined thereby.

The invention claimed is:

1. An apparatus for cooking food products, comprising a main body, a containing chamber suitable to contain a cooking liquid, an exit element comprising at least one exit aperture for the cooking liquid in said containing chamber, and a removal device associated with said exit element, said removal device comprising at least an attachment element and a discharge tube, said attachment element being connected in a selectively removable way to said exit element, wherein said exit element comprises an automatic command device and a valve retention element, said valve retention element being associated with at least one return spring, and having an open position correlated to the connected condition of said attachment element to said exit element, and a closed position correlated to the removed position of said attachment element to said exit element, wherein said attachment element comprises teeth which, in the connection condition with the exit element, are configured to thrust said valve retention element toward the inside of the main body, determining the opening thereof, and wherein said discharge tube is rotatable with respect to said attachment element from a first position, in which said discharge tube's axis is aligned with the axis of said exit element, in which said discharge tube allows the passage of cooking liquid therein, to a second position with said discharge tube's axis angled with respect to the axis of said exit element, in which said discharge tube prevents the passage of liquid therein.

2. The apparatus as in claim 1, further comprising one or more gaskets interposed between the exit element and the removal device, configured to guarantee the hydraulic seal between said exit element and said removal device until the complete closure of the valve retention element is ensured.

3. The apparatus as in claim 1, wherein said exit element is positioned on a lateral wall of said containing chamber, substantially in correspondence to its bottom.

4. The apparatus as in claim 1, wherein said exit element comprises a filtering element adjacent to said aperture.

5. The apparatus as in claim 1, wherein the removable connection between said removal device and said exit element is obtained by one or other of either a pressure, a rotation, a screwing, a snap-in connection, or other similar or comparable mean.

6. The apparatus as in claim 1, wherein said exit element comprises a mouth inside which said automatic command device is housed.

7. The apparatus as in claim 6, wherein said discharge tube rotates inside a hollow seating chamber that defines respective guides and end of travel.

* * * * *